June 13, 1944.   R. T. BEDARD   2,351,389
MECHANICAL MOVEMENT
Filed Aug. 12, 1942
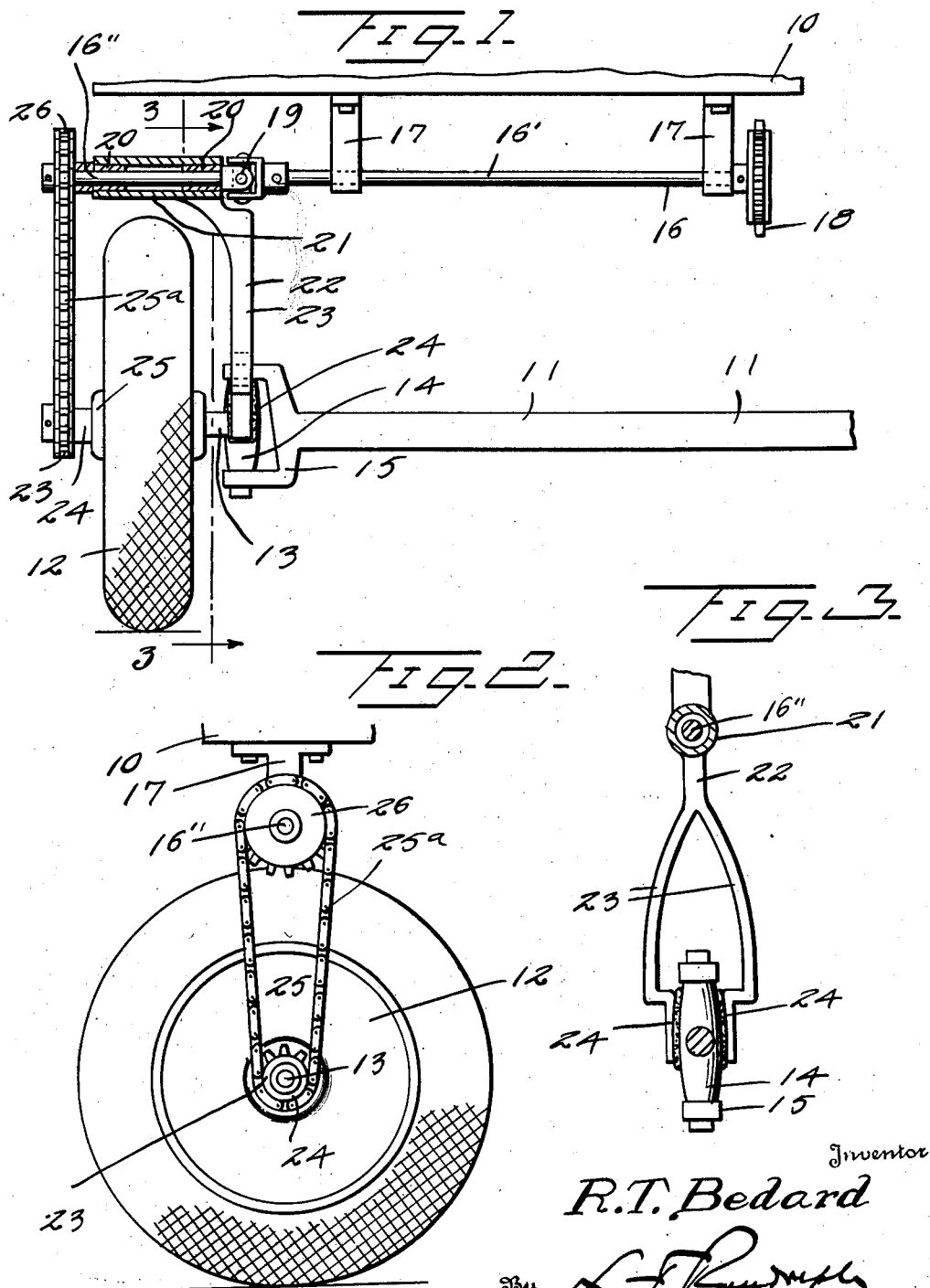
Inventor
R. T. Bedard Patented June 13, 1944

2,351,389

UNITED STATES PATENT OFFICE 2,351,389

MECHANICAL MOVEMENT

Roy T. Bedard, Escanaba, Mich.

Application August 12, 1942, Serial No. 454,607

2 Claims. (Cl. 74—13)

This invention relates to a means to operate or propel a reel of a harvesting machine, steering mechanism of a harvester, usually a wheel, and such a mechanism or mechanical movement to operate the reel, which will swing with the wheel.

The more specific objects and advantages will become apparent from a consideration of the description following taken in connection with accompanying drawing illustrating one operative embodiment.

In said drawing:

Figure 1 is a fragmentary view showing my improvement primarily in front elevation but partly in section, in connection with a steering wheel on a harvester;

Figure 2 is a fragmentary side elevation showing the wheel and drive therefrom and Figure 3 is a vertical section taken of the line 3—3 of Figure 1.

Referring specifically to the drawing wherein like reference characters designate like or similar parts, the body of a harvester is fragmentarily shown at 10 in connection with its front axle 11, mounted thereon or rigid with respect thereto. One of the front or steering wheels, usually pneumatically tire equipped, is shown at 12, journaled on the usual stub shaft 13 which projects from the usual spindle 14, mounted to steer or swing on a vertical axis in a yoke on the axle 11.

A shaft 16 is provided to operate or propel the reel of the harvester (not shown) and it may be journaled on either the harvester 10, its platform, or the axle 11. As shown, bearings 17 depend from the platform to the harvester 10 and shaft 16 is journaled therein and provided with a sprocket wheel 18 as one means from which power may be transmitted from the shaft 16 to such reel. Such shaft 16 is sectional and the sections are connected together by a universal joint 19 disposed vertically, directly over or in line with the vertical axis of the spindle 14. The main section of the shaft 16 is designated 16' and is directly journaled in the bearings 17 while the other or shorter section 16" of such shaft is directly journaled in bushings at 20, directly mounted by the horizontal sleeve or tubular part 21 of a bearing 22. A bearing or bracket 22 below the sleeve 21 is bifurcated or provided with arms 23' which are terminally welded at 24 or otherwise rigidly attached to opposite sides of the spindle 14.

Power is transmitted in any suitable way from wheel 12 to the shaft section 16', which power is derived by the tractive action of the wheel. For instance, a sprocket wheel 23 is rigid with a short tubular shaft 24, attached by a plate 25 bolted or otherwise secured to the body of the wheel 12 and which is journaled on the shaft 13. Traversing the sprocket 24 is a sprocket chain 25a which is trained over a sprocket wheel 26, rigid on the short shaft 16".

As a result of the construction described, the shaft 16" will swing with the wheel, driving the shaft section 16' because of the universal joint at 19, and propelling or operating the reel of the harvester.

Various changes may be resorted to provided they fall within the spirit and scope of the invention.

I claim as my invention:

1. In combination with a steering wheel mounted on a spindle to turn on a vertical axis, bearing means on one side of the wheel rigid with and rising from said spindle, said bearing means being of inverted L shape with one arm in the form of a sleeve disposed above and extending outwardly across the wheel, a power-takeoff shaft means journaled in said sleeve to operate an auxiliary part, said shaft means having a universal joint approximately in line with said axis enabling it to flex in accordance with steering movement of the wheel, and means to drive the shaft from the wheel disposed on the side of the latter opposite to said bearing means.

2. In combination with a steering wheel mounted on a spindle to turn on a vertical axis, bearing means on one side of the wheel rigid with and rising from said spindle, said bearing means being of inverted L shape with one arm in the form of a sleeve disposed above and extending outwardly across the wheel, a power-takeoff shaft means journaled in said sleeve to operate an auxiliary part, said shaft means having a universal joint approximately in line with said axis enabling it to flex in accordance with steering movement of the wheel, means to drive the shaft from the wheel disposed on the side of the latter opposite to said bearing means comprising a sprocket attached to the wheel, a sprocket attached to said shaft, and chain means operatively connecting the sprockets, said bearing means having arms terminally spaced apart and welded to opposite sides of the spindle.

ROY T. BEDARD.